Dec. 10, 1957  R. L. DORT  2,815,632
HARVESTING MACHINE
Filed March 30, 1956
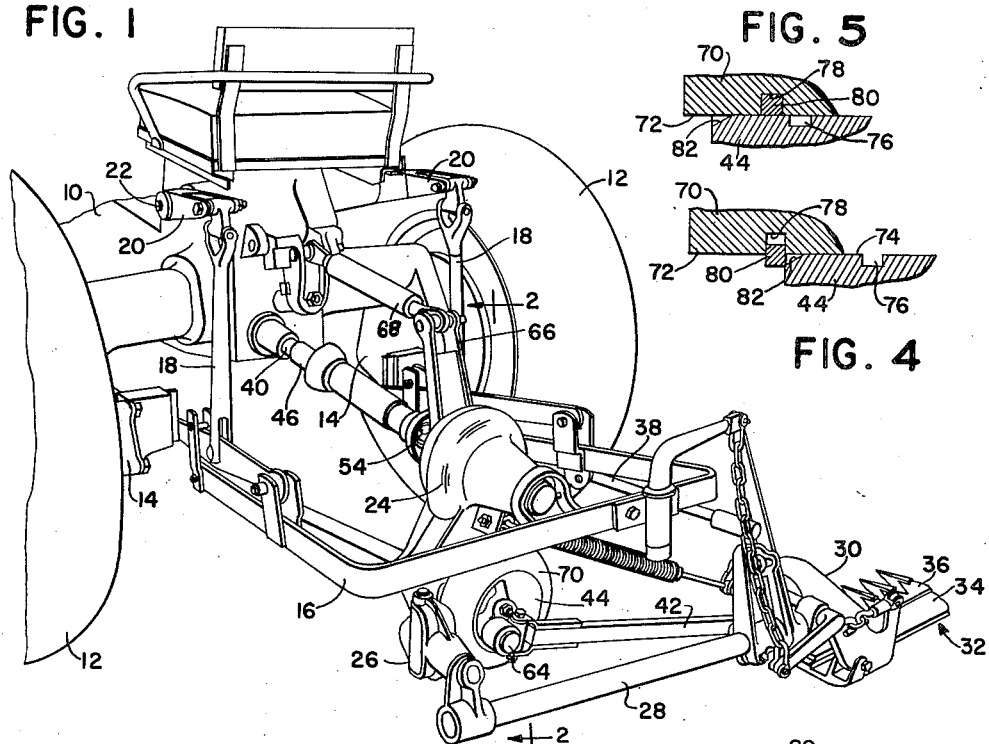
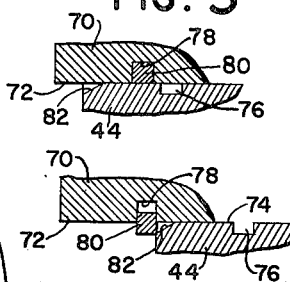
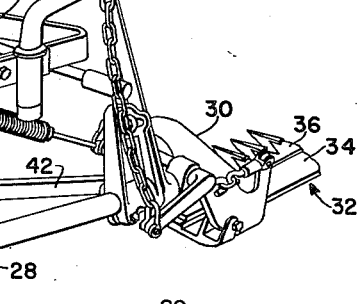
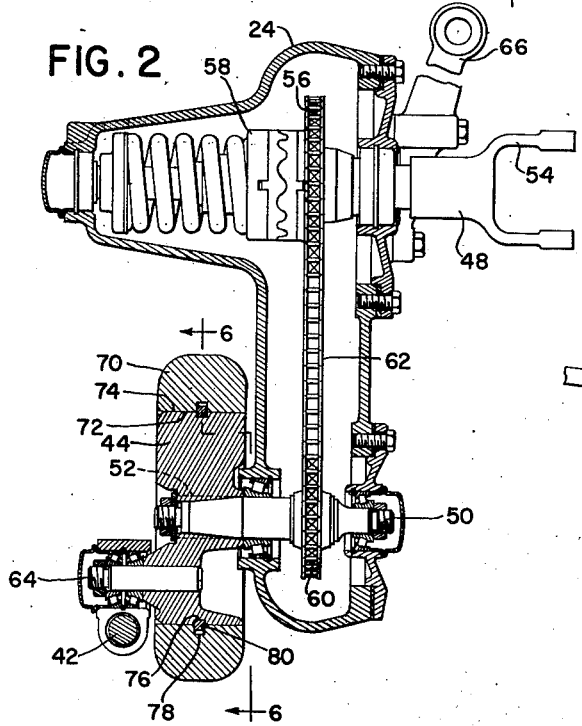
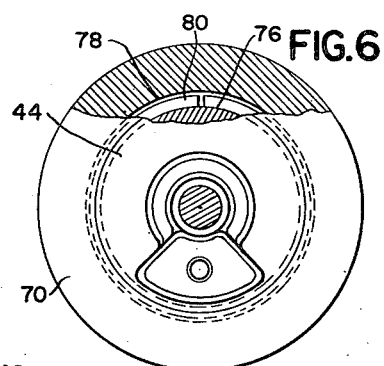
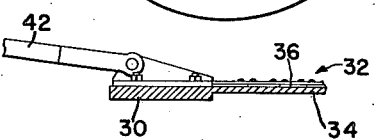
INVENTOR.
R. L. DORT

United States Patent Office 2,815,632
Patented Dec. 10, 1957

2,815,632

HARVESTING MACHINE

Russell L. Dort, Davenport, Iowa, assignor to Deere & Company, Moline, Ill., a corporation of Illinois Application March 30, 1956, Serial No. 575,039

4 Claims. (Cl. 56—25)

This invention relates to a harvesting machine and more particularly to drive mechanism for a machine of the type that has cutting apparatus including a reciprocating cutter, such as a mower and other machines of similar types.

Because of the very nature of a reciprocating cutter, vibrations of substantial magnitude are set up and must be absorbed either in the frame of the machine or in a flywheel of adequate weight. The flywheel has heretofore offered the better solution but itself presents a problem because of the effects of the kinetic energy thereof when the cutter is suddenly started or stopped. For example, should the cutter encounter a foreign object which instantly halts operation, the inertia forces tending to continue operation result in pitman breakage or damage to other driving connections. The normal use of a friction device such as a slip clutch or a drive belt does not solve this problem because the flywheel is interposed in the drive between the friction device and the cutter.

According to the present invention, these problems are eliminated by the provision of a flywheel ring which frictionally encircles a rotary driving member to which the pitman is connected. In a preferred embodiment of the invention, the rotary member has an annular outer surface and the flywheel ring has an inner annular surface frictionally engaging the member surface so that the flywheel ring is substantially positively driven by the rotary member but is capable of relative angular movement so as to overrun the member when the cutter is overloaded, the kinetic energy of the flywheel being thus dissipated as friction between the surfaces rather than being transmitted to the frame and driving parts. A more specific object of the invention resides in means for interlocking the member and flywheel ring against axial displacement, a preferred embodiment including an annular groove in the outer surface of the rotary member, an annular groove in the inner surface of the flywheel ring, and these grooves being in radial register and accommodating a snap ring.

The foregoing and other important objects and desirable features inherent in and encompassed by the invention will become apparent as a preferred embodiment thereof is disclosed, by way of example, in the annexed sheet of drawings, the several figures of which will be described immediately below.

Fig. 1 is a perspective view of a rear portion of a tractor-mounted mower.

Fig. 2 is a vertical section through the supporting housing of the mower as seen generally along the line 2—2 of Fig. 1.

Fig. 3 is a fragmentary elevational view with parts broken away and shown in section showing the relationship between the pitman and the reciprocating cutter.

Figs. 4 and 5 are fragmentary enlarged views, with parts broken away and shown in section, illustrating the assembly of the flywheel ring and rotary member.

Fig. 6 is a sectional view as seen along the line 6—6 of Fig. 2.

As previously indicated, the harvesting machine chosen as representative of that in which the invention finds particular utility is a tractor-mounted mower, the tractor being of any conventional construction and having a fore-and-aft body 10 supported on traction wheels 12. The body includes depending portions 14 to which are attached the forward ends of the legs of a rearwardly extending U-shaped supporting frame 16, the details of which are not material here. The frame is suspended from the tractor by means of lift links 18 which are in turn connected at their upper ends to lift arms 20 carried on a transverse rockshaft 22. The supporting frame thus provided is relatively light and flexible but is sufficiently strong for the purposes intended.

The mower itself comprises basically a main housing 24 having a lower support 26 to which the inner end of a laterally extending drag bar 28 is connected. The outer end of the drag bar carries a conventional yoke or inner shoe construction 30 which forms part of cutting apparatus 32, here of a typical construction including a cutter bar 34 and a reciprocating cutter or sickle 36. The inner shoe construction 30 is additionally tied to the supporting frame 16 by a fore-and-aft extending pull link 38.

The tractor, as is typical, is equipped with a rearwardly extending power shaft 40 for driving the cutter 36 via a pitman 42, a circular rotary member 44 and a power train including a propeller shaft 46, an intermediate shaft 48 and a drive shaft 50, to the last-named of which the rotary member 44 is coaxially fixed as by a key 52.

The shaft 48 is appropriately journaled in an upper portion of the housing 24 and is connected to the propeller shaft 46 by a universal joint 54. Interiorly of the housing 24, the shaft 48 has journaled thereon a driving sprocket 56 which is, however, connected to the shaft 48 for rotation therewith by means of a typical slip clutch 58. The drive shaft 50 has a sprocket 60 keyed thereto and this sprocket and the sprocket 56 are interconnected by a drive chain 62. The rotary member 44 is externally of the lower portion of the housing 24 and drives a crank 64 which is connected in turn to the pitman 42. In the embodiment illustrated, the crank 64 is established as a pin carried by the rotary member 44 in parallelism with but eccentric to the drive shaft 50.

In addition to the supporting structure previously described, the housing 24 has an upstanding arm 66 which is connected by a top link 68 to a suitable attaching point on the tractor, the construction illustrated being representative of any of the well-known three-point hitches.

From the description thus far, it will be seen that the power take-off shaft 40 of the tractor drives the cutter 36 via the propeller shaft 46, intermediate shaft 48, drive shaft 50, rotary member 44, crank 64 and pitman 42. To this extent, the power train and drive may be considered typical of that known in the prior art, with the possible exception of various types of damping and counterbalance devices. The drive is typical of those in which rotary motion (here the member 44) is translated to reciprocating motion (the cutter 36). Intervening in the drive is the oscillatory motion of the pitman 42, one end of which reciprocates with the cutter 36 and the other end of which rotates with the rotary member 44.

The basic improvement provided by the present invention resides in an annular member or flywheel ring 70, carried by the rotary member 44 by means of an annular inner surface 72 on the ring and an annular outer surface 74 on the member. The diameters of these surfaces are such that the ring is not only carried by the member 44 but is frictionally driven thereby. In a preferred embodiment, the member 44 as well as the ring 70 is a grey iron casting. If the only forces imposed on the rotary member 44 were those incident to its own rotation, the ring 70 would normally rotate with the member, the frictional surfaces 72—74 being sufficient for that purpose. In addition to these surfaces, there is provided means for constraining the members against relative axial displacement. In the form of the invention illustrated, this means comprises an annular groove 76 in the outer surface of the member 44, an annular groove 78 in the inner surface of the ring 70 and a snap ring 80 received by and projecting radially into both grooves so as to establish the interlock. The snap ring is preferably of any well-known split type, being biased to a normal mean diameter approximately equal to the diameter of the flywheel. When the ring and member are assembled, the grooves 76 and 78 are, of course, in radial register.

The ring and member are assembled as best illustrated in Figs. 4 and 5. The basic or normal diameter of the ring 80 is such that its inner diameter corresponds with the inner diameter of the member groove 76. The ring groove 78 is somewhat deeper than the radial dimension of the ring 80 so as to temporarily accommodate the ring when the ring is expanded during assembly. That is to say, the ring 80 is contracted sufficiently to register with the groove 78 and is then allowed to expand to be received in the groove 78 as shown in Fig. 4. The member 44 is then forced axially into the assembly, the ring 80 being urged or expanded radially outwardly into the excessive depth of the groove 78 by an annular ramp 82 on the ring 44. As the ring 70 and member 44 are moved relatively endwise or axially, the grooves 76 and 78 ultimately attain radial register and the snap ring 80 contracts into the member groove 76, with portions of the snap ring projecting into both grooves so as to establish the interlock.

During normal operation of the harvester, the ring 70 will be substantially positively driven by the member 44 except that the ring is capable of overrunning the member 44 when the cutter bar becomes suddenly overloaded and the ring can be overrun by the member upon sudden starting of the member. Hence, the kinetic energy of the flywheel ring will be dissipated in friction, rather than being transmitted to the supporting structure and drive train as inertia forces. The greatest benefits of the invention are obtained when the cutter 36 encounters a sudden overload, as when a foreign object is wedged between the guards and knife, since the flywheel ring will overrun the rotary member. Conversely, on sudden starts, the rotary member will temporarily overrun the flywheel ring. In view of the elimination of the transmission of kinetic energy shocks to the frame and power train, the component parts have considerably longer lives, particularly in the cases of the pitman and universal joints, which are recognized points of early failure. The same results to different degrees are experienced relative to the supporting structure and its attachment to the tractor, for example.

Features of the invention not categorically enumerated herein will undoubtedly occur to those versed in the art, as will many modifications and alterations in the preferred embodiment disclosed, all of which may be achieved without departing from the spirit and scope of the invention.

What is claimed is:

1. In a harvester, the combination of a supporting frame; cutting apparatus carried by the frame and including a reciprocating cutter; a drive shaft journaled on the frame; a circular drive member fixed coaxially to the shaft and having a crank thereon eccentric to the shaft axis, said member having an outer annular surface; a pitman interconnecting the crank and reciprocating cutter; a flywheel ring concentric with the drive member and having an inner annular surface frictionally engaging the outer surface of said member so that said flywheel ring is carried and driven by said member but is capable of moving angularly relative to said member when the cutter encounters an overload whereby the kinetic energy of the flywheel ring will be dissipated as friction between said surfaces; and means cooperative between the member and ring for holding them against relative axial displacement.

2. The invention defined in claim 1 in which: the member has an annular groove in the outer surface thereof, the flywheel ring has an annular groove in the inner surface thereof in radial register with the member groove, and a snap ring concentrically received by and projecting radially into both grooves to interlock the member and flywheel ring, said grooves and snap ring constituting said means for holding the member and ring against axial displacement.

3. In a harvester, the combination of a supporting frame; cutting apparatus carried by the frame and including a reciprocating cutter; a power shaft; a drive shaft journaled on the frame; drive means interconnecting the shafts and including a slip clutch; a circular drive member fixed coaxially to the shaft and having a crank thereon eccentric to the shaft axis, said member having an outer annular surface; a pitman interconnecting the crank and reciprocating cutter; a flywheel ring concentric with the drive member and having an inner annular surface frictionally engaging the outer surface of said member so that said flywheel ring is carried and driven by said member but is capable of moving angularly relative to the member when the cutter encounters an overload whereby the kinetic energy of the flywheel ring will be dissipated as friction between said surfaces; and means cooperative between the member and ring for holding them against relative axial displacement.

4. In a harvester, the combination of a supporting frame; cutting apparatus carried by the frame and including a reciprocating cutter; a drive shaft journaled on the frame; a circular drive member fixed coaxially to the shaft and having a circular friction surface; a crank driven by the member; a pitman interconnecting the crank and reciprocating cutter; a flywheel ring concentric with the drive member and having a circular friction surface engaging the outer surface of said member so that said flywheel ring is driven by said member but is capable of moving angularly relative to said member when the cutter encounters an overload whereby the kinetic energy of the flywheel ring will be dissipated as friction between said surfaces; and means cooperative between the member and ring for holding them against relative axial displacement.

References Cited in the file of this patent

UNITED STATES PATENTS

| | | |
|---|---|---|
| 737,477 | Radebaugh | Aug. 25, 1903 |
| 1,426,336 | Sperry | Aug. 15, 1922 |
| 2,438,206 | Day | Mar. 23, 1948 |
| 2,730,911 | Silberstein | Jan. 17, 1956 |
| 2,769,297 | Orelind et al. | Nov. 6, 1956 |